US00H002198H

(19) United States
(12) Statutory Invention Registration
Quimby

(10) Reg. No.: US H2198 H
(43) Published: Aug. 7, 2007

(54) MULTI-STAGE PYROLYSIS SYSTEMS FOR TREATING CHLORINE CONTAMINATED WASTES

(75) Inventor: Jay M. Quimby, Hillsborough, NJ (US)

(73) Assignee: CH2M Hill Inc., Englewood, CO (US)

(21) Appl. No.: 10/208,259

(22) Filed: Jul. 30, 2002

(51) Int. Cl.
*B22B 3/00* (2006.01)

(52) U.S. Cl. ..... 423/1; 588/404; 588/406; 588/415; 588/401; 423/240 S; 423/241; 423/240 R

(58) Field of Classification Search ..... 588/404, 588/406, 415, 401; 423/240 S, 241, 240 R
See application file for complete search history.

(56) References Cited

U.S. PATENT DOCUMENTS

| | | | | |
|---|---|---|---|---|
| 3,616,768 | A | | 11/1971 | Southwick |
| 4,179,263 | A | | 12/1979 | Jung et al. |
| 4,182,246 | A | | 1/1980 | Lombana et al. |
| 4,279,208 | A | | 7/1981 | Guillaume et al. |
| 4,648,328 | A | | 3/1987 | Keough |
| 4,679,268 | A | | 7/1987 | Gurries et al. |
| 4,819,571 | A | | 4/1989 | Hallett |
| 4,937,065 | A | | 6/1990 | Maurer et al. |
| 4,961,391 | A | | 10/1990 | Mak et al. |
| 5,050,511 | A | | 9/1991 | Hallett et al. |
| 5,183,646 | A | * | 2/1993 | Anderson et al. ..... 423/210 |
| 5,200,033 | A | * | 4/1993 | Weitzman ..... 159/47.1 |
| 5,205,225 | A | | 4/1993 | Milsap, III |
| 5,220,873 | A | | 6/1993 | Milsap, III |
| 5,224,432 | A | | 7/1993 | Milsap, III |
| 5,279,234 | A | | 1/1994 | Bender et al. |
| 5,471,937 | A | | 12/1995 | Kosky et al. |
| 5,541,386 | A | | 7/1996 | Alvi et al. |
| 5,550,311 | A | | 8/1996 | Young |
| 6,024,032 | A | | 2/2000 | Sharpe |
| 6,067,915 | A | | 5/2000 | Sharpe |
| 6,178,899 | B1 | | 1/2001 | Kaneko et al. |
| 6,273,008 | B1 | | 8/2001 | Taylor |

OTHER PUBLICATIONS

Zevenhoven & Saeed (2000) Proceedings of R'2000 World Congress on Reovery, Recycling, Reintegration, "Two–Stage Combustion of High–PVC Solid Waste With HCL Recovery" pp. 1212–1217, no month.

Luijk, (1994) Mechanism of Formation of Polychlorinated Dibenzo–*p*–dioxins and Dibenzofuras in the Catalyzed Combustion of Carbon, *Environ Sci. Technol.* 28:312–321, no month.

"Mecanismes de formation, sources de production" in Anonymous (2000). Dioxines dans l'environnement: quels risques pour la santé?. Paris: Editions INSERM. ISBN: 2855987849; Series ISSN: 1264–1782. Chapter 2. pp. 17–27. (English translation also provided), no date.

* cited by examiner

*Primary Examiner*—Michelle Clement
(74) *Attorney, Agent, or Firm*—Swanson & Bratschun, L.L.C.

(57) ABSTRACT

A method of decontaminating solids contaminated with chlorinated hydrocarbons includes a first step of heating the contaminated solids at a temperature high enough to volatize chlorine contaminates but below a temperature range favorable to the formation of the dioxins and furans to dechlorinate the contaminated solids. Volatilized chlorine contaminates are removed from the dechlorinated contaminated solids. The dechlorinated contaminated solids are then purged with an inert gas to remove oxygen from the dechlorinated contaminated solids. Thereafter the dechlorinated contaminated solids are heated in the absence of oxygen to a temperature sufficient to crack hydrocarbons contaminating the solids to lower molecular weight hydrocarbons.

15 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

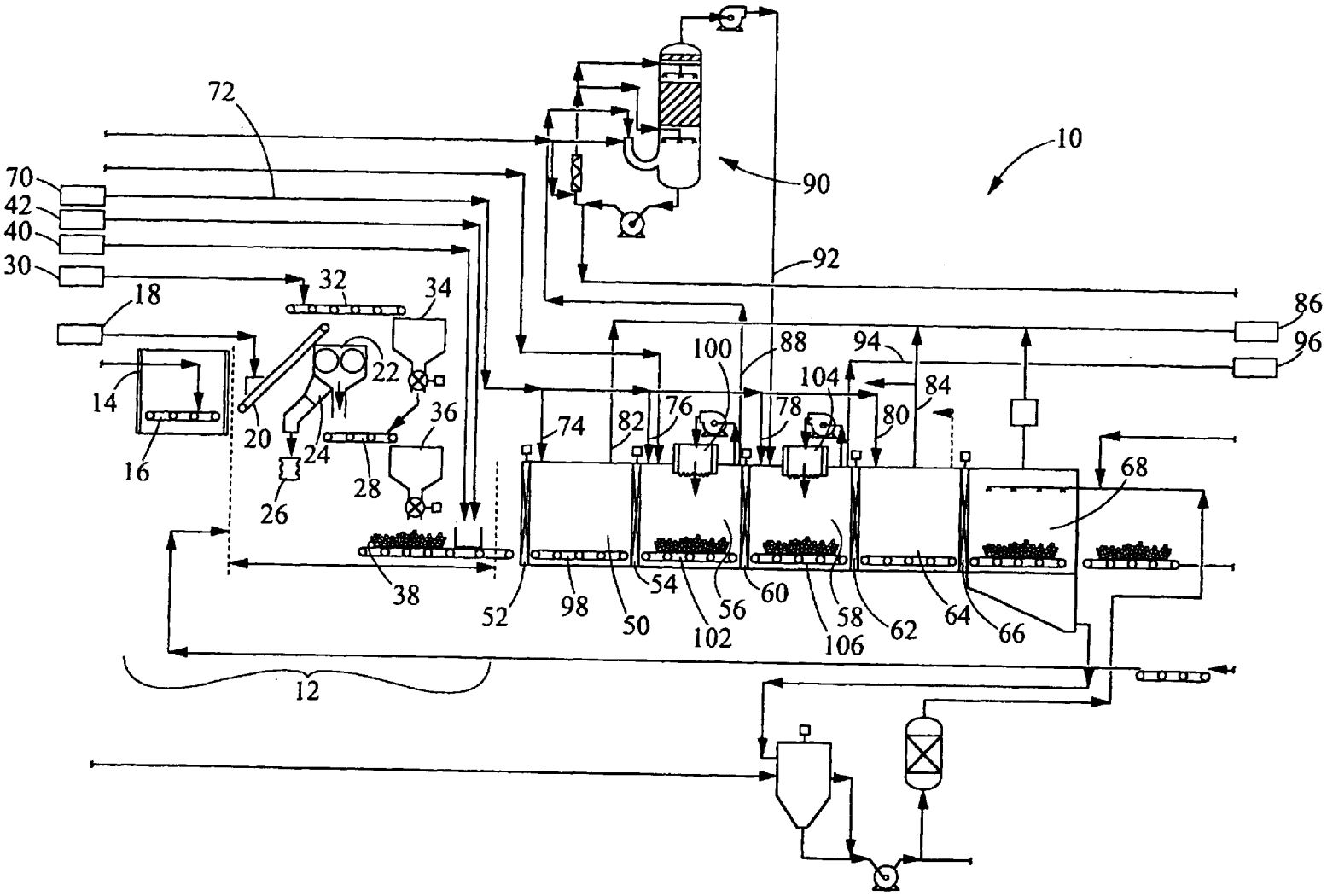
10
12
14
16
18
20
22
24
26
28
30
32
34
36
38
40
42
50
52
54
56
58
60
62
64
66
68
70
72
74
76
78
80
82
84
86
88
90
92
94
96
98
100
102
104
106

MULTI-STAGE PYROLYSIS SYSTEMS FOR TREATING CHLORINE CONTAMINATED WASTES

TECHNICAL FIELD

The present invention is directed toward an apparatus and method for the destruction of hazardous chlorinated hydrocarbons, and more particularly to a multi-stage pyrolysis system for treating solid wastes contaminated with chlorinated hydrocarbons.

BACKGROUND ART

The chemical weapons program of the U.S. military has lead to the production of thousands of tons of hazardous chemical warfare munitions. At the present time many of these weapons are being decommissioned by disassembly and destruction. Incineration has been approved for destruction of the chemical warfare agents, but concerns about generation of harmful byproducts has lead to reexamination of the wisdom of incineration.

In addition to destruction of chemical warfare agents, associated wastes such as wood pallets, demilitarization protection ensemble (DPE) suits, contaminated activated carbon and miscellaneous wastes (cardboard, plastics, metals), collectively, "dunnage," must be decontaminated. Under U.S. Army regulations, solid waste potentially contaminated with chemical warfare agents must undergo "5x" treatment. Treatment of waste materials to 5x has been determined to result in solids free of chemical warfare agents and which are safe for handling by the general public. 5x treatment requires solids to be heated to at least 1000° F. for at least 15 minutes.

Unfortunately, many of the chemical warfare agents contain chlorine atoms. In addition, the dunnage may be contaminated with chlorine atoms. For example, the DPE suits comprise chlorinated organic polymers. Other dunnage wastes may be contaminated with chlorinated organic compounds, for example pentachlorophenol which is used for insect resistance and polychlorinated bi-phenol (PCB) compounds, both of which are toxic. Heating of the dunnage and chemical warfare agents containing chlorinated hydrocarbons in the presence of oxygen at temperatures between 400-800° F. has been found to result in the production of harmful dioxins and furans.

Several attempts have been made in the prior art to eliminate the production of harmful furans and dioxins during cracking or destruction of hydrocarbons in the presence of chlorine by removing chlorine atoms before high temperature incineration. For example, Zevenhoven and Saeed, Two-Stage Combustion of High-PVC Solid Waste with HCl Recovery, Proceedings of R'2000 World Congress on Recovery, Recycling, Reintegration, Toronto, Canada, Jun. 5-9, 2000, pp. 1212-1217 (HTTP:www.rrr2000.com)—discloses a waste to energy process based on high-PVC solid wastes that includes a two-stage combustion of high-PVC solid waste with hydrochloric acid recovery. In a first step, the PVC fraction is heated between 200-400° C. (396-750° F.) in the presence of an inert gas (nitrogen) in an attempt to remove chlorine from residual solids. The chlorine is removed in the form of a high temperature HCL gas. In a second stage the solids are incinerated in an oxidizing environment. Zevenhoven and Saeed teach that the removal of the chlorine before incineration limits dioxin/furan formation and removal of the hot HCL gas from the incineration minimizes corrosion. While Zevenhoven and Saeed teach the use of pyrolysis to remove chlorine molecules from the residual solids, they teach this removal in the range of 200-400° C., which is an optimum temperature range for the formation of harmful furans and dioxins. Thus, heating in this temperature range actually increase the chances of dioxin formation. Subsequent incineration in the presence of oxygen further enhances the opportunity for the formation of dioxins and furans from any chlorine molecules that were not successfully removed in the first stage.

In a like manner Kneko et al., U.S. Pat. No. 6,178,899, teaches the desirability of limiting a supply of oxygen during pyrolysis of chlorine containing solids so as to minimize the risk of formation of dioxins and furans. After a pyrolysis step the waste is subject to cracking in the presence of oxygen in a temperature range of 1000-1200° C. Kneko is silent with respect to the temperature at which the pyrolysis is conducted. As with Zevenhoven and Saeed, if this pyrolysis is done at temperatures over 400° F., a risk of dioxin formation remains notwithstanding the absence of oxygen.

With the prior art recognized that heating chlorinating organics in the absence of oxygen can remove chlorine compounds while minimizing production of undesirable dioxins and furans, the teachings of the prior art still run the risk of dioxin and furan formation from oxygen released from the heated hydrocarbons combining with chlorine molecules at a temperature suitable for dioxin and furan formation to yield undesirable dioxins and furans. Another problem faced by prior art treatments for decontaminating chemical warfare munitions is validating treatment of the solids under the 5x conditions, i.e., heating to at least 1000° F. for at least 15 minutes. Their problem results because solid wastes entering the unit can potentially pass through the unit at a rate faster than that predicted, causing an unacceptably short exposure times.

SUMMARY OF THE INVENTION

A first aspect of the present invention is a method of decontaminating solids contaminated with chlorinated hydrocarbons. The method includes heating the contaminated solids at a temperature high enough to volatize chlorine contaminates but below a temperature range favorable to the formation of dioxins and furans to dechlorinate the contaminated solids. Volatized (gas phase) chlorine contaminates are removed from the dechlorinated contaminated solids. The dechlorinated contaminated solids may be purged with an inert gas to remove oxygen from the dechlorinated contaminated solids. Thereafter the dechlorinated contaminated solids are heated in the absence of oxygen to a temperature sufficient to crack hydrocarbons contaminating the solids into lower molecular weight hydrocarbons. The heating of the dechlorinated contaminated solids below the temperature range favorable to the formation of dioxins and furans is preferably performed in the absence of oxygen. The solids may first be purged with an inert gas prior to volatilization of the chlorine contaminates. In one embodiment the solids are heated to less than 400° F. Preferably the solids are heated in a range of between 300-400° F. The heating of the dechlorinated contaminated solids in the absence of oxygen is preferably conducted at a temperature of at least 1000° F. for at least 15 minutes.

As second aspect of the present invention is a method of decontaminating solids contaminated with chlorinated hydrocarbons including purging the contaminated solids with an inert gas to substantially remove oxygen form the contaminated solids. The purged contaminated solids are heated at a first temperature high enough to volatize chlorine contaminants but below a temperature range favorable to the formation of dioxins and furans to dechlorinate the contaminated solids. The volatized chlorine contaminants are purged with an inert gas. The dechlorinated contaminated solids are heated to a second temperature sufficient to crack hydrocarbons contaminating the solids into lower molecular weight hydrocarbons. The dechlorinated contaminated solids are purged with an inert gas to remove the gaseous cracked lower molecular weight hydrocarbons. The first temperature is preferably less than 400° F. The second temperature is preferably greater than or equal to 1000° F. and the dechlorinated contaminated solids are heated for at least 15 minutes. The purged gas containing volatized chlorine contaminates is preferably subjected to means for removal of the chlorinated contaminates to produce a dechlorinated purge gas. The dechlorinated purge gas may then be combined with the dechlorinated contaminated solids and heated to the second temperature to crack any residual hydrocarbons.

The method of decontaminating solids contaminated with chlorinated hydrocarbons of the present invention decomposes the chlorinated contaminants at a temperature below that necessary for the formation of dioxins and furans to ensure removal of the chlorine contaminants before dioxins or furans can be formed. The additional step of performing this first heating in the absence of oxygen (i.e., pyrolysis) further minimizes the possibility of the formation of dioxins and furans. Subsequent heating of the dechlorinated solids in an oxygen free environment at or above the temperature necessary for the formation of dioxins and furans minimizes the dioxin and furan formation because of the prior removal of chlorine and the absence of oxygen. Thus, the two stage pyrolysis process as described herein minimizes the potential formation of dioxins and furans while still providing the necessary level of decontamination required to ensure an absence of hazardous chemical warfare agents.

BRIEF DESCRIPTION OF THE DRAWINGS

The FIGURE is a schematic representation of an apparatus for performing multi-stage pyrolysis in accordance with the present invention.

DETAILED DESCRIPTION OF THE PREFERRED EMBODIMENT

A multi-stage pyrolysis apparatus 10 is illustrated schematically in the FIGURE. Located upstream from the multi-stage pyrolysis apparatus 10 is an optional dunnage processor 12 for processing and delivering dunnage to the multi-stage pyrolysis apparatus 10. The dunnage processor 12 includes an airlock chamber 14 containing a conveyor 16 for receiving wood products contaminated with chlorinated hydrocarbons, such as the pesticide pentachlorophenol. The airlock chamber 14 isolates the dunnage and possible harmful contaminates from the area of a building or grounds where it is located. It further limits transport of gas phase contaminants from one area to another. These contaminated wood products are combined with other contaminated or potentially contaminated wood from a wood supply 18 and conveyed by conveyor 20 to a shredder 22. The shredder 22 shreds the input wood material into small pieces suitable for further processing. The shredder 22 includes a magnetic separator 24 for separating nails, screws and other metal parts associated with the wood products and these metal parts are collected in the container 26. Shredded wood exits the shredder 22 and is deposited onto conveyor 28. Other contaminants may be combined with the shredded wood products for processing with the shredded wood products. For example, a supply of spent activated carbon filters 30 may be delivered by conveyor 32 to hopper 34 and mixed with the wood products at the conveyor 28. The combined wood products and spent carbon are delivered to hopper 36 from where they can be delivered as needed to bins 38 which are suitable for conveying the hydrocarbon contaminated solids through the multi-stage pyrolysis apparatus 10. Other solids may be added to the bin 38 prior to pyrolysis treatment. For example, gas treatment solids from a supply 40 or demilitarization protective ensembles (DPE) suits from a supply 42.

The multi-stage pyrolysis apparatus 10 consists of a series of airlock chambers suitable for receiving the bins 38 filled with contaminated solids and isolating the contaminated solids from the surrounding environment. More particularly, a charging airlock chamber 50 has a first portal 52 suitable for isolating the charging airlock chamber 50 from the ambient environmental and a second portal 54 suitable for portable an airlock between an adjacent low temperature pyrolysis chamber 56. Adjacent to the low temperature pyrolysis chamber 56 is a high temperature pyrolysis chamber 58. The high temperature pyrolysis chamber 58 is separated from the low temperature pyrolysis chamber 56 by a third portal 60 that selectively defines an airlock between the high and low temperature pyrolysis chambers. A fourth airlock portal 62 selectively isolates the high temperature pyrolysis chamber 58 from a discharge chamber 64. A fifth airlock portal 66 permits access to the discharge chamber 64 from the outside environment. In a preferred embodiment, a cooling/quenching chamber 68 receives a bin 38 from the discharge airlock chamber 64. Thereafter, the decontaminated solids are discharged for disposal.

An inert purge gas supply 70, for example nitrogen, is in fluid communication with the charging airlock chamber 50, the low temperature pyrolysis chamber 56, the high temperature pyrolysis chamber 58 and the discharge chamber 64 through a purge gas distribution system 72 which delivers the purge gas to a purge gas inlet 74, 76, 78, 80, associated with the charging airlock chamber 50, the low temperature pyrolysis chamber 56, the high temperature pyrolysis chamber 58 and the discharge chamber 64, respectively. A purge gas outlet 82 is operatively associated with the charging airlock chamber 50. Purge gas outlet 84 is operatively associated with the discharge chamber 64 to vent the purge gas to suitable cleaning apparatus such as a carbon filter 86.

Off gases from the low temperature pyrolysis chamber 56 are vented through outlet 88 to an apparatus for removal of hydrochloric acid and chlorine gas 90. A conduit 92 delivers dechlorinated gas containing hydrocarbons to the high temperature pyrolysis chamber 58 to subject the hydrocarbons to cracking as will be described further below. An outlet 94 from the high temperature pyrolysis chamber 58 delivers cracked hydrocarbons to a pollution control apparatus 96 for particulate removal, converting carbon monoxide to carbon dioxide and for converting volatile organic compounds to carbon dioxide and water.

While the embodiment disclosed herein contemplates a single low temperature and a single high temperature pyrolysis chamber, there may be as many pyrolysis treatment chambers as necessary to achieve the required material processing rates.

The two-stage pyrolysis treatment method is carried out using the two-stage pyrolysis treatment apparatus as follows. A bin 38 of contaminated solids is delivered to the charging airlock chamber 50. Once inserted, the first portal 52 and the second portal 54 are closed to isolate the interior of the charging airlock chamber 50. The inert purge gas is delivered by purge gas inlet 74 and functions to purge or remove substantially all oxygen gas from the charging airlock chamber 50. Purge gas is exhausted through purge gas outlet 82 where it is subject to carbon filters for removal of hydrocarbon gases that may be displaced with the oxygen.

Following purging of oxygen in the charging airlock chamber 50, the second portal 54 is opened and the bin 38 is conveyed by a conveyor 98 to the low temperature pyrolysis chamber 56. Once inside, the second portal 54 is sealed and the contaminated solids are heated by heater 100 to a temperature high enough to volatilize chlorine contaminates, but below a temperature range favorable to the formation of dioxins and furans to dechlorinate the contaminated solids. The temperature is preferably at about 300° F. and in any event less than about 400° F. The contaminated solids remain in the low temperature pyrolysis chamber 56 long enough to substantially remove all chlorine atoms associated with the contaminated solids. Purge gas delivered through the purge gas inlet 76 maintains the low temperature pyrolysis chamber 56 oxygen free and conveys the chlorine gas and attendant hydrochloric acid gas vapors through outlet 88 for delivery to the hydrochloric acid and chlorine gas removal apparatus 90. The hydrochloric acid and chlorine gas removal apparatus 90 may be a wet scrubber or solid adsorbent. Cleaned gas can be discharged to conditional air pollution control equipment for further treatment of volatile organic compounds or, as illustrated in the FIGURE, directed into the high temperature pyrolysis chamber 58 via conduit 92 for cracking.

Following removal of chlorine atoms in the low temperature pyrolysis chamber 56, the third airlock portal 60 is opened and the bin 38 is conveyed by conveyor 102 to the high temperature pyrolysis chamber 58. Thereafter the third portal 60 is sealed and the high temperature pyrolysis chamber 58 is heated by heater 104 to a temperature sufficient to crack to the remaining hydrocarbon into lower weight molecular hydrocarbons. Where the method and apparatus is used for destruction of chemical warfare agents and contaminated handling equipment this requires heating of the solids to a temperature of at least 1000° F. for at least 15 minutes. Cracked hydrocarbon gases are removed with the purge gas through outlet 94 and delivered to pollution control apparatus 96 for removal of particulate matter, conversion of carbon monoxide to carbon dioxide and conversion of volatile organic compounds to carbon dioxide and water vapor. Following pyrolysis in the high temperature pyrolysis chamber 58, the fourth airlock portal 62 is opened and the bin 38 is passed to the discharge chamber 64 by conveyor 106. Once sealed within the discharge chamber 64 additional purge gas is supplied via purge gas inlet 80 and removed by purge gas outlet 84 for delivery to the carbon filters 86. After a suitable retention time the fifth airlock chamber 66 is opened and the solids are exposed to ambient air within the cooling/quenching chamber 68. In the cooling/quenching chamber 68 solids are quenched with water and cooled as desired. Thereafter the now decontaminated solids are disposed of.

It is important to note that within each of the chambers 50, 56, 58 and 64, the solids are isolated from the adjacent chambers by the airlocks until they are passed to a subsequent chamber.

The preferred embodiment of the present invention contemplates a batch mode including transporting the contaminated solids in bins which ensures the process will not be short circuited. The method may also be employed with continuous treatments systems using rotating internal mechanisms to transport the solids between adjacent pyrolysis zones. One representative rotating internal mechanism of this type is illustrated in Kaneko, U.S. Pat. No. 6,178,899, which is incorporated by reference herein. However, such rotating internal mechanisms causing mixing or abrasion of the solids which can generate particulates which may stimulate dioxin and furan formation. Thus, while such an apparatus may be used to practice the present invention and would be within the scope of the claimed method, the batch apparatus described herein is preferred in part because it minimizes the formation of particulates during processing.

As briefly described above, within the low temperature pyrolysis chamber, chlorinated hydrocarbons are decomposed forming predominately hydrochloric acid with lesser amounts of chlorine gas and volatile organic compounds. The exact mechanism for the pyrolysis of pentachlorophenol is unknown, but is believed to be illustrated as follows:

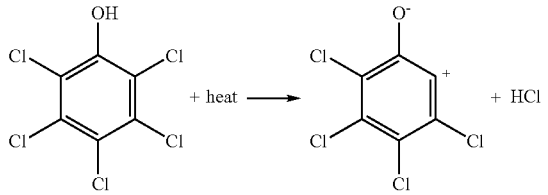

Pyrolysis of polychlorinated ethylene which comprises the DPE suits is also not known, but is believed to be illustrated as follows:

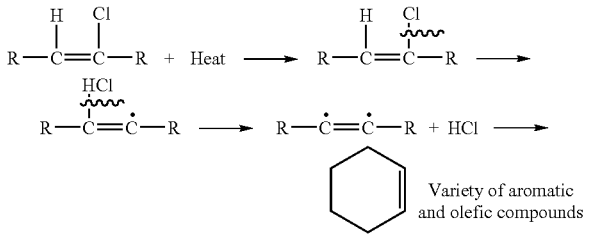

The actual mechanisms may vary somewhat from that shown above. Other chlorinated hydrocarbons are decomposed to release chlorine gas, hydrochloric acid and volatile chlorinated organics in a similar manner for removal from the contaminated solids.

Within the high temperature pyrolysis chamber 58 high molecular weight hydrocarbons are cracked through exposure to high temperatures in the absence of oxygen to form carbon monoxide, carbon dioxide and lower molecular weight hydrocarbon gases.

The two state pyrolysis apparatus and method described above is intended to remove elements which are necessary to the formation of dangerous dioxins and furans during heating and cracking of the contaminated waste. Key variables that have been identified in the prior art as affecting dioxin and furan are particulate material in the gas stream, transition metals that are exposed from corrosion of metal ducting or are associated with combustion fly ash, HCl and chlorine gas concentration, an oxidative environment, and, perhaps most important, a favorable temperature range of 400-850° F. The initial oxygen purging in the charging airlock chamber 50 substantially removes oxygen gas from the contaminated solids. Within the low temperature pyrolysis chamber 56 dioxin or furan production is prevented both by the absence of oxygen necessary for oxidation by virtue of the continuous purging with an inert gas such as nitrogen and by temperatures below that necessary for the formation of dioxins and furans. This permits the removal of chlorine compounds which otherwise may lead to dioxin and furan production in the high temperature pyrolysis chamber 58. Processing in a batch mode using the preferred apparatus described herein also minimizes the formation of particulate matter. Within the high temperature pyrolysis chamber 58 two primary factors again prevent or minimize the formation of dioxins and furans. First, as discussed above the contaminated solids are dechlorinated in the low temperature pyrolysis chamber 56. In addition to the absence of chlorine atoms in the gas phase in the chamber 58, the inert purge gas 78 removes oxygenated organic compounds that may result from the cracking of the large molecular weight hydrocarbons. Thus, the substantial absence of chlorinate gases and the substantial absence of oxygen gas necessary for oxidation effectively prevents dioxin and furan production, notwithstanding the potential of favorable temperatures in the range of 400-850° F. during heating and cooling of the solids as they enter and leave the high temperature pyrolysis chamber. Production of dioxins and furans are further discouraged by removal of highly corrosive HCl and chlorine gases before the high temperature pyrolysis. Removal of these gases minimizes corrosion of the metal components which could create transition metals favoring dioxin and furan production. Moreover, as mentioned above, the preferred batch process minimizes formation of particulate matter known to simulate dioxin and furan formation.

The present invention is particularly beneficial for the decommissioning of chemical warfare agents and the decontaminating of handling equipment and meets the governments required 5x treatment requiring temperatures of 1000° F. for at least 15 minutes. The two stage pyrolysis system assures that in both the low temperature pyrolysis chamber 56 and the high temperature pyrolysis chamber 58 at least two of the necessary condition for the formation of dioxins and furans are not present. Thus, the two stage pyrolysis apparatus and method provides the required decontamination of the treated solids without the dangerous of production of dioxins and furans.

What is claimed is:

1. A method of decontaminating solids contaminated with chlorinated hydrocarbons comprising:

a) heating the contaminated solids at a temperature high enough to volatize chlorine contaminates but below a temperature range favorable to the formation of dioxins and furans to dechlorinate the contaminated solids;

b) removing the volatilized chlorine contaminates from the dechlorinated contaminated solids; and c) cracking hydrocarbons contaminating the solids into lower molecular weight hydrocarbons by heating the dechlorinated contaminated solids in the absence of oxygen to a temperature sufficient to crack hydrocarbons.

2. The method of claim 1 wherein step a) is performed in the absence of oxygen.

3. The method of claim 1 wherein prior to step a) the contaminated solids are purged with an inert gas and the heating of step a) is conducted while purging the contaminated solids with an inert gas.

4. The method of claim 1 wherein step b) is performed by purging the volatilized chlorine contaminates from the contaminated solids with an inert gas and then subjecting the purge gas containing the volatilized chlorine contaminates to means for removal of the chlorinated contaminates to produce a dechlorinated purge gas.

5. The method of claim 4 further comprising flowing the dechlorinated purge gas to the heating step d) to subject any residual hydrocarbons in the dechlorinated purge gas to cracking.

6. The method of claim 1 wherein the heating temperature of step a) is less than 400° F.

7. The method of claim 1 wherein the heating temperature of step a) is between 300-400° F.

8. The method of claim 1 wherein the heating temperature of step d) is at least 1000° F. and the dechlorinated solids are exposed to the temperature of at least 1000° F. for at least 15 minutes.

9. The method of claim 1 wherein the solids reside in a container during steps a)-d).

10. The method of claim 1 further comprising before step c) purging the dechlorinated contaminated solids with and inert gas to remove oxygen from the dechlorinated contaminated solids.

11. A method of decontaminating solids contaminated with chlorinated hydrocarbons comprising:

a) purging the contaminated solids with an inert gas to substantially remove oxygen gas from the contaminated solids;

b) heating the contaminated solids at a first temperature high enough to volatilize chlorine contaminates but below a temperature range favorable to the formation of dioxins and furans to dechlorinate the contaminated solids;

c) purging the contaminated solids with an inert gas to remove the volatilized chlorine contaminates;

d) cracking hydrocarbons contaminating the solids into lower molecular weight hydrocarbons by heating the dechlorinated contaminated solids to a second temperature sufficient to crack hydrocarbons and e) purging the dechlorinated contaminated solids with an inert gas to remove gaseous cracked lower molecular weight hydrocarbons.

12. The method of claim 11 wherein the first temperature of step b) is less than 400° F.

13. The method of claim 12 wherein the second temperature of step d) is greater than or equal to 1000° F. and the dechlorinated solids are heated for at least 15 minutes.

14. The method of claim 11 further comprising subjecting the purge gas containing the volatilized chlorine contaminates to means for removal of the chlorinated contaminates to produce a dechlorinated purge gas.

15. The method of claim 14 further comprising flowing the dechlorinated purge gas to the heating step d) to subject any residual hydrocarbons in the dechlorinated purge gas to cracking.

* * * * *